United States Patent Office 3,021,292
Patented Feb. 13, 1962

3,021,292
HYDROCARBON RUBBER-VINYL CONTAINING ORGANOPOLYSILOXANE COMPOSITION AND METHOD OF MAKING SAME
Dallas T. Hurd, Burnt Hills, and Robert C. Osthoff, Schenectady, N.Y., assignors to General Electric Company, a corporation of New York
No Drawing. Filed Aug. 16, 1954, Ser. No. 450,230
13 Claims. (Cl. 260—3)

This invention relates to hydrocarbon rubber-vinyl containing organopolysiloxane compositions. More particularly, this invention is concerned with covulcanizable mixtures comprising from 25 to 95 percent, by weight, of a hydrocarbon gum and from 5 to 75 percent, by weight, of a vinyl-containing organopolysiloxane gum having the formula (1) 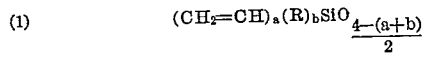
$$\frac{(CH_2=CH)_a(R)_bSiO_{4-(a+b)}}{2}$$

where $a$ has a value of from 0.0086 to 0.18, $b$ has a value from 1.80 to 2.0014 and the sum of $a+b$ is equal to from about 1.98 to 2.01, and R represents members selected from the class consisting of alkyl radicals, e.g., methyl, ethyl, butyl, isobutyl, octyl, etc. radicals; cycloalkyl radicals, e.g., cyclohexyl, cycloheptyl, etc. radicals; aryl radicals, e.g., phenyl, diphenyl, etc. radicals; aralkyl radicals, e.g., tolyl, xylyl, ethylphenyl, etc. radicals; alkaryl radicals, e.g., benzyl, phenylethyl, etc. radicals; haloaryl radicals, e.g., chlorophenyl, dibromophenyl, etc. radicals; and mixtures of the aforesaid members, at least 50 mole percent of said members being methyl radicals. This invention is also concerned with a rubbery product comprising a covulcanizate of (A) from 45 to 99 percent, by weight, of the covulcanizable mixture described above, (B) from 0 to 50 percent, by weight, of an inorganic filler, and (C) from 1 to 5 percent, by weight, of a sulfur vulcanizing agent. This invention is also concerned with the method of preparing the rubbery product described above.

Heretofore, it has been known to incorporate organopolysiloxane materials into hydrocarbon latices, gums, or rubbers. Thus, from 1 to 10 percent, by weight, of dimethylsiloxane gums have been incorporated into butyl gum to decrease the "nerve" or tendency of a distorted sample of butyl gum to return to its original shape when the distorting force is removed. From 0.01 to 0.10 percent, by weight, of dimethylpolysiloxane fluids have been incorporated into numerous synthetic rubbers to reduce the stickiness of the rubber during the milling operation. From 1 to 10 parts, by weight, of organopolysiloxane fluids have been added to natural and synthetic rubber latices per hundred parts by weight of solids in the latex to increase the resistance to scuffing of articles made from the latex. Although the products prepared by using these dimethylsiloxane fluids and solids for the purposes described above are satisfactory in many applications, they suffer the disadvantage of being mere mixtures of silicone materials with hydrocarbon rubber materials. Being mere mixtures, they tend to separate from each other during storage and use. Thus, when mixtures of dimethylsilicone materials and hydrocarbon rubbers are stored, it is found that there is a tendency for the silicone material to "bleed" out of the hydrocarbon rubber base so that an intimate mixture is no longer present. This same bleeding effect is also noticed when mixtures of dimethylsiloxane materials and hydrocarbon rubbers are maintained at elevated temperatures. The net effect of this bleeding is to decrease the low temperature flexibility, decrease the thermal stability, decrease the effective strength, and decrease the moisture resistance of the mixtures.

We have discovered that this bleeding effect of rubber materials containing organopolysiloxanes may be eliminated by forming a true covulcanizate of the silicone material with the hydrocarbon rubber. We have found that covulcanizates of silicone materials and hydrocarbon rubbers may be prepared from organopolysiloxanes containing silicon bonded unsaturated aliphatic radicals and hydrocarbon gums. More particularly, we employ organopolysiloxane gums having silicon bonded vinyl radicals within the scope of Formula 1 with any of the well known hydrocarbon gums to form a covulcanizate of the silicone gum and the hydrocarbon gum. We have found that these covulcanizates display no bleeding, have improved moisture resistance over prior art materials including straight hydrocarbon rubbers, have higher temperature stability than hydrocarbon rubbers, display greater flexibility at low temperatures than hydrocarbon rubbers, have greatly improved electrical properties, and are more adaptable to commercial applications than pure silicone rubbers since they are less expensive than silicone materials due to the incorporation of the hydrocarbon rubber constituent.

The silicone materials within the scope of Formula 1 which are employed in the practice of the present invention are described in detail in our copending application Serial No. 450,229, filed concurrently herewith and assigned to the same assignee as the present invention, now Patent No. 2,867,599. These compounds may be prepared by copolymerizing a mixture of a relatively low molecular weight organopolysiloxane containing silicon bonded vinyl radicals with a low molecular weight saturated organopolysiloxane or with a mixture of low molecular weight saturated organopolysiloxanes. By "saturated organopolysiloxane" is meant an organopolysiloxane having no aliphatic unsaturation in the organic radicals attached to silicon. Suitable low molecular weight vinyl-containing organopolysiloxanes may be prepared by hydrolyzing a vinyl-containing silane such as methylvinyldichlorosilane or divinyldichlorosilane and separating the polysiloxane material formed. The hydrolysis of a compound such as methylvinyl dichlorosilane forms linear methylvinylsiloxanes as well as the cyclic methylvinylsiloxanes such as are described in Roedel Patent 2,420,911, issued May 20, 1947. Among the saturated organopolysiloxanes which may be copolymerized with the low molecular weight vinyl-containing organopolysiloxane may be mentioned the cyclic organopolysiloxanes such as the cyclic dimethylsiloxanes, diethylsiloxanes, methylethylsiloxanes, methylphenylsiloxanes, diphenylsiloxanes, etc. In addition to cyclic organopolysiloxanes, linear and branched-chain polysiloxanes such as are described in Patnode Patents 2,469,888 and 2,469,890, issued May 10, 1949, may be used. In place of the silicon bonded methyl radicals described in these Patnode patents, organopolysiloxanes of similar structure containing higher alkyl and aryl radicals within the definition of R of Formula 1 bonded to silicon may also be employed. In addition to the cyclic and chain-stopped linear or branched-chain materials described, we may also employ amounts of trifunctional organopolysiloxanes such as the partial hydrolyzate of methyltrichlorosilane, phenyltrichlorosilane, etc.

In forming the vinyl-containing organopolysiloxane gum from the relatively low molecular weight vinyl-containing organopolysiloxane and the relatively low molecular weight saturated organopolysiloxane, it is necessary to select amounts of each group of compounds so that the vinyl-containing organopolysiloxane gum will have the ratio of vinyl radicals to silicon atoms described by Formula 1. In selecting the particular vinyl-containing siloxane and saturated organopolysiloxanes employed in the polymerization, it is necessary to select particular compounds which will result in an organopolysiloxane gum having a ratio of total organic radicals to silicon atoms within the range required by Formula 1.

The polymerization of the mixture of the relatively low molecular weight vinyl-containing organopolysiloxane and the relatively low molecular weight saturated organopolysiloxane to a gum may be effected in the well known manner by contacting the mixture with from about 0.001 to 0.5 percent, by weight, of an organopolysiloxane polymerization catalyst and heating the mixture to a temperature sufficient to cause polymerization. Among the suitable organopolysiloxane polymerization catalysts may be mentioned cesium hydroxide, rubidium hydroxide, as well as the transient organopolysiloxane polymerization catalysts such as the solid quaternary ammonium hydroxide catalysts disclosed in the application of Simon W. Kantor, Serial No. 429,132, filed May 11, 1954, and assigned to the same assignee as the present invention and now abandoned, and the quaternary phosphonium catalysts which are described in the copending application of Simon W. Kantor and Robert C. Osthoff, Serial No. 429,134, filed May 11, 1954, and assigned to the same assignee as the present invention and now abandoned.

The hydrocarbon gums employed in the covulcanizate of the present invention may be the natural gum from which natural rubbers are prepared or any of the well known synthetic gums from which the synthetic rubbers are prepared. The term "gum" as used in the present application is intended to mean the solid, rubbery polymer, copolymer or interpolymer from which vulcanized rubbers are prepared as distinguished from the vulcanized rubber itself. Among the synthetic gums which may be employed in the practice of the present invention are, for example, butyl gum, styrene-butadiene gum, nitrile gum, neoprene gum, polyacrylic ester gum, polysulfide gum, isobutylene gum, etc. The term "butyl gum" is intended to mean, broadly, a solid rubbery copolymer or interpolymer comprising the product of polymerization of a mass of copolymerizable materials containing, by weight, a major proportion of a low molecular weight olefin (monoolefin), more particularly an isoolefin, e.g., isobutylene (isobutene), 2-ethylbutene-1, etc., and a minor proportion of a low molecular weight conjugated diolefin, e.g., butadiene, isoprene, cyclopentadiene, pentadiene-1,3-hexadiene-2,4, etc. More specific examples of butyl gums embraced by the above definition are those wherein the amount of diolefin present is from about 2 to 5 percent, by weight, of the total weight of the monoolefin and the diolefin. This butyl gum is available to the trade and is also known as GR–I. Reference is made to Thomas et al. Patent 2,356,128, issued August 22, 1944, for more detailed information concerning butyl gum, its properties and method of preparation. Typical of the compositions disclosed by Thomas et al. is a synthetic solid, plastic hydrocarbon interpolymer of a major proportion of an isoolefin having less than 8 carbon atoms per molecule and a minor proportion of a conjugated diolefin having from 4 to 8, inclusive, carbon atoms per molecule, which interpolymer is characterized by low saturation as evidenced by an iodine number below 50, a molecular weight about 15,000, and an approximate specific gravity of 0.91.

Styrene-butadiene gum, commonly referred to as GR–S or styrene gum, is a copolymer of approximately 70 to 80 percent of butadiene and 20 to 30 percent of styrene. Nitrile gum, commonly known as Buna N, refers to a copolymer of butadiene and acrylonitrile containing from about 55 to 80 percent butadiene and 20 to 45 percent, by weight, of acrylonitrile. Neoprene gum is a high molecular weight polymer of chloroprene (2-chlorobutadiene). The polyacrylic ester gums are high molecular weight condensation products of acrylic acids and alcohols such as n-butanol. Polysulfide gums are the rubbery condensation products of an organic dihalide and an alkaline polysulfide. Isobutylene gum is the high molecular weight homopolymer of isobutylene. For a more complete discussion of the compositions, properties, and preparation of the synthetic hydrocarbon gums within the scope of the present invention, attention is directed to "Modern Synthetic Rubbers" by Harry Barron, published in 1944 by D. Van Nostrand Co., New York, N.Y., and to "Vinyl and Related Polymers" by Calvin E. Schildknecht, published in 1952 by John Wiley & Sons, Inc., New York, N.Y.

The covulcanizable mixture of the vinyl-containing organopolysiloxane of Formula 1 and the hydrocarbon gum may be vulcanized in the same manner as a 100 percent hydrocarbon gum is vulcanized. Thus, typical sulfur vulcanization agents including sulfur, sulfur halides, or sulfides may be used to effect vulcanization. The vulcanizable material may also contain any of the various reinforcing fillers such as carbon black, zinc oxide, clay, whiting, slate flour, silica, etc., incorporated into the covulcanizable mixture. Preferably, we employ carbon black as a filler for the covulcanizable material of the present invention since carbon black appears to be the most effective reinforcing agent and is relatively inexpensive. As in the case of 100 percent hydrocarbon rubbers, the covulcanizate of the present invention may have incorporated therein cure accelerators such as mercaptobenzothiazole, diphenylguanidine, tetramethylthiuramdisulfide, zincdimethyldithiocarbamate, benzothiazodisulfide, etc. The covulcanizate also may have incorporated therein accelerator activators such as zinc oxide, stearic acid, etc., as well as softeners, odorants, and pigments. In general, the formulation for the covulcanizate of the present invention comprises (A) from 45 to 99 percent, by weight, of a mixture of from 25 to 95 percent hydrocarbon gum and 5 to 75 percent, by weight, of a vinyl-containing organopolysiloxane gum within the scope of Formula 1, (B) from 0 to 50 percent, by weight, of filler, and (C) from 1 to 5 percent, by weight, of a sulfur curing agent. Where an accelerator is employed we employ from about 0.5 to 5 percent of the accelerator based on the total weight of the covulcanizate and from about 0.5 to 5 percent, by weight, of an accelerator activator, based on the weight of the covulcanizate.

The covulcanizable materials of the present invention may be prepared by thoroughly mixing the hydrocarbon gum with the vinyl-containing organopolysiloxane gum of Formula 1 on a differential rubber milling roll or in a Banbury mixer. The two ingredients are milled with the required amount of the sulfur vulcanization agent until a completely uniform mixture is obtained. Where the covulcanizate has a filler and an accelerator and an accelerator activator incorporated therein, the ingredients are milled in a similar manner on rubber differential rolls or in a Banbury mixer until a uniform mixture is obtained. After milling of the covulcanizable mixture, vulcanization is effected by heating the mixture at temperatures from about 110 to 160° until vulcanization is completed. This heating operation may take place in an oven at atmospheric pressure, or in a heated press, or on heated rolls or in an extrusion apparatus. The time required for vulcanization varies from a few minutes to several hours depending on the particular materials employed and whether or not a vulcanization accelerator is employed.

The following examples are illustrative of the practice of our invention and are not intended for purposes of limitation.

Example 1

A vinyl-containing organopolysiloxane gum having the average structural formula

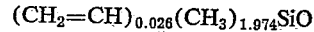

was prepared by the method of our aforementioned application Serial No. 450,229, by polymerizing a mixture of 3 parts, by weight, of the cyclic pentamer of methylvinylsiloxane with 97 parts, by weight, of octamethylcyclotetrasiloxane under the action of cesium hydroxide.

A 25 gram sample of this silicone gum was added to 75 grams of pale natural crepe gum which had been milled on differential rubber milling rolls for several minutes. After thoroughly mixing the two gums, 50 grams of carbon black (Kosmos 60), 3 grams of finely divided sulfur, 1.25 grams of benzothiazodisulfide, and 1 gram of zinc oxide were added to the product on the milled rolls and thoroughly mixed. The milled mixture was then press-cured for 30 minutes at 150° C. to yield a rubbery product having a tensile strength of 1800 p.s.i. at 400 percent elongation with a tear resistance of 400 p.s.i. This product retained its flexibility at temperatures as low as −50° C. and could be maintained at 100° C. for extended periods of time without effecting its properties.

*Example 2*

By the method of Example 1, 75 grams of a copolymer of approximately 76.5 percent butadiene and 23.5 percent styrene (GR–S gum) was added to 25 grams of the vinyl-containing organopolysiloxane gum of Example 1 on differential rubber milling rolls. After thoroughly mixing the two gums, 50 grams of carbon black (Kosmos 60), 3 grams of finely divided sulfur, and 1.25 grams of benzothiazodisulfide were milled into the gum mixture. The resulting milled product was press-cured for 30 minutes at 150° C. to give a rubbery product having a tensile strength of 1700 p.s.i. at 300 percent elongation with a tear resistance of 105 p.s.i. This rubber exhibited good flexibility at −50° C. and showed no signs of decomposition after being maintained for extended periods of time at 100° C.

*Example 3*

The procedure of Example 2 was followed except that nitrile gum (a copolymer of approximately 65 percent butadiene and 35 percent acrylonitrile) was used in place of the GR–S gum. After press-curing this gum for 30 minutes at 150° C. the rubbery product had a tensile strength of 1550 p.s.i. at 300 percent elongation and a tear resistance of 75 p.s.i. This rubber was flexible at −50° C. and showed no signs of decomposition at 100° C.

*Example 4*

A vinyl-containing organopolysiloxane having the formula $$(CH_2=CH)_{0.017}(CH_3)_{1.983}SiO$$

was prepared by the method of our aforementioned copending application, Serial No. 450,229, by heating 2 parts, by weight, of the cyclic pentamer of methylvinylsiloxane and 98 parts, by weight, of octamethylcyclotetrasiloxane with cesium hydroxide at 150° C. until a gum was formed. By the method of the preceding examples, 1 part of this vinyl-containing organopolysiloxane gum was added to 1 part of butyl gum (a copolymer of a diolefin and a major proportion of isobutylene, namely, 2 parts, by weight, of isoprene and 98 parts, by weight, of isobutylene). To this gum mixture was added ¼ part, by weinght, of carbon black (Kosmos 60) and ¼ part, by weight, silica aerogel (Santocel C). To the filled gum was then added, based on the weight of the gum, 3 percent finely divided sulfur, 1.25 percent benzothiazodisulfide and 5 percent zinc oxide. After milling, the mixture was cured for 30 minutes in a press at 150° C. to form a product having a tensile strength of about 700 p.s.i. When this same material was press-cured for 1 hour at 150° C. the tensile strength was 1050 p.s.i. at 600 percent elongation. After a 2 hour cure under the same conditions, the tensile strength was 1160 p.s.i. and after 20 hours under the same condition the tensile strength was 1300 p.s.i. at 300 percent elongation. The final product was flexible at −50° C. and could be bent and twisted easily at this temperature without cracking. After a 20 hour cure the rubbery product had a tear resistance of about 250 p.s.i.

*Example 5*

A vinyl-containing organopolysiloxane gum was prepared by the method of our aformentioned application, Serial No. 450,229, by polymerizing 4 parts, by weight, of the cyclic pentamer of methylvinylsiloxane and 96 parts, by weight, of octamethylcyclotetrasiloxane with cesium hydroxide. This gum had the average structural formula $$(CH_2=CH)_{0.035}(CH_3)_{1.965}SiO$$

One part, by weight, of this gum was milled on differential rubber milling rolls with 1 part, by weight, of the butyl gum described in Example 4. This gum mixture was then milled with 25 percent carbon black (Kosmos 60), 3 percent finely divided sulfur, 1.25 percent benzothiazodisulfide, and 3 percent zinc oxide, the above percentages being based on the total weight of the gum. After curing for 30 minutes at 150° C. the rubbery product had a tensile strength of about 720 p.s.i. at 1300 percent elongation. After an additional cure for 2 hours at 150° C. the tensile strength of the rubber was 1500 p.s.i. at 900 percent elongation. This rubber was flexible at temperatures as low as −50° C.

*Example 6*

Equal parts of the vinyl-containing organopolysiloxane gum of Example 5 and the butyl gum of Example 4 were milled together to form a uniform mixture. This mixture was then compounded with 25 percent calcium carbonate (Whitetex), 25 percent diatomaceous earth (Celite), 3 percent finely divided sulfur, and 1.25 percent benzothiazodisulfide, the above percentages being weight percentages based on the total gum weight. The compounded mixture was then press-cured at 150° C. for 1 hour and after cooling its dielectric strength was found to be 935 volts per mil at 66 percent elongation of the rubber sheet. A standard butyl rubber formulation prepared with these same fillers and tested at 66 percent elongation exhibited a dielectric strength of 376 volts per mil.

*Example 7*

By the method of our aforementioned copending application Serial No. 450,229, a vinyl-containing organopolysiloxane gum having the formula $$(CH_2=CH)_{0.0097}(CH_3)_{1.336}(C_2H_5)_{0.655}SiO$$

was prepared by copolymerizing a mixture of 1 part, by weight, of the cyclic pentamer of methylvinylsiloxane, 59 parts, by weight, of octamethylcyclotetrasiloxane, and 40 parts, by weight, of octaethylcyclotetrasiloxane with cesium hydroxide. Equal parts of this gum and the butyl gum of Example 4 were compounded to form an intimate mixture. The gum mixture was then compounded with 25 percent carbon black (Kosmos 60), 3 percent finely divided sulfur, 1.25 percent benzothiazodisulfide, and 3 percent zinc oxide, the foregoing percentages being based on the total weight of the gum. After curing the compounded product for 30 minutes at 150° C. a rubbery product having a tensile strength of 720 p.s.i. at 1300 percent elongation was obtained. After an additional cure at 150° C. for 2 hours the rubber had a tensile strength of about 1050 p.s.i. and was flexible at −50° C.

*Example 8*

A vinyl-containing organopolysiloxane gum having the formula $$(CH_2=CH)_{0.016}(CH_3)_{1.766}(C_6H_5)_{0.218}SiO$$

was prepared by the method of our aforementioned application Serial No. 450,229, by polymerizing 1 part of the cyclic pentamer of methylvinylsiloxane, 49 parts of octamethylcyclotetrasiloxane, and 16 parts of octaphenylcyclotetrasiloxane with cesium hydroxide. One part of this gum was compounded with 1 part of the butadiene-styrene (GR–S) gum of Example 2 on differential rubber milling rolls. This mixed gum then was compounded with 25 percent carbon black (Kosmos 60), 3 percent finely divided sulfur, 1.25 percent benzothiazodisulfide and 3 percent zinc oxide, the foregoing percentages being based on the total weight of the gum mixture. The compounded product had a tensile strength of 300 p.s.i. at 200 percent elongation after a 30 minute press-cure at 150° C. Further heating of the product at 150° C. extended its tensile strength to about 700 p.s.i.

Although the examples disclose only filled covulcanizates, it should be understood that the mixtures of the present invention may be cured by sulfur without the addition of any filler.

The covulcanizable mixtures of the present invention are useful per se as a dielectric material in transformers, capacitors and the like where extremes of temperatures are encountered and are useful per se as intermediates in the preparation of covulcanized rubbery products. These covulcanized rubbery products, whether filled or unfilled, are valuable as gasket material, wire coating material, as fillers for electrical cables, as encasing materials for transformers, capacitors, and the like where extreme resistance to changes in temperatures is desired along with high dielectric strength, moisture resistance, and relatively low cost, and for other application, such as aircraft tires, rubber tires or structural parts for automotive vehicles, military equipment, etc. where improved flexibility and strength over a wide range of temperature is desired.

What we claim as new and desire to secure by Letters Patent of the United States is:

1. A sulfur covulcanizable mixture comprising (a) from 45 to 99%, by weight, of a mixture containing on a weight basis from 25 to 95 parts of a vulcanizable gum selected from the class consisting of natural rubber, a copolymer of a diolefin and a monoolefin wherein the diolefin is equal to at most 5%, by weight, of the total weight of the diolefin and the monoolefin, a copolymer of butadiene and acrylonitrile, a copolymer of butadiene and styrene, and a homopolymer of 2-chlorobutadiene, and from 5 to 75 parts of an organopolysiloxane gum composition convertible to the cured, solid, elastic state having the formula $$(CH_2=CH)_a(R)_bSiO_{\frac{4-(a+b)}{2}}$$

where $a$ has a value of from 0.0086 to 0.18, $b$ has a value of from 1.80 to 2.0014, the sum of $a+b$ has a value from 1.98 to 2.01, and R represents a member selected from the class consisting of alkyl, cycloalkyl, aryl, aralkyl, alkaryl and haloaryl radicals and mixtures of the aforesaid radicals, at least 50 mole percent of said members being methyl radicals, and the said vinyl groups in the organopolysiloxane being the only silicon-bonded alkenyl radicals in the covulcanizable mixture, and (b) up to 50%, by weight, of an inorganic filler.

2. The covulcanizable mixture of claim 1 in which the first vulcanizable gum is natural rubber gum.

3. The covulcanizable mixture of claim 1 in which the first vulcanizable gum is a copolymer of a diolefin and a major proportion of isobutylene.

4. The covulcanizable mixture of claim 1 in which the first vulcanizable gum is a copolymer of butadiene and styrene.

5. The covulcanizable mixture of claim 1 in which the first vulcanizable gum is a copolymer of butadiene and acrylonitrile.

6. A sulfur covulcanizable mixture comprising (a) from 45 to 99%, by weight, of a mixture containing on a weight basis from 25 to 95 parts of a vulcanizable gum selected from the class consisting of natural rubber, a copolymer of a diolefin and a monoolefin wherein the diolefin is equal to at most 5%, by weight, of the total weight of the diolefin and the monoolefin, a copolymer of butadiene and acrylonitrile, a copolymer of butadiene and styrene, and a homopolymer of 2-chlorobutadiene, and from 5 to 75 parts of an organopolysiloxane gum composition convertible to the cured, solid, elastic state having the formula $$(CH_2=CH)_a(R)_bSiO_{\frac{4-(a+b)}{2}}$$

where $a$ has a value of from 0.0086 to 0.18, $b$ has a value of from 1.80 to 2.0014, the sum of $a+b$ has a value from 1.98 to 2.01, and R represents a member selected from the class consisting of alkyl, cycloalkyl, aryl, aralkyl, alkaryl, and haloaryl radicals and mixtures of the aforesaid radicals, at least 50 mole per cent of said members being methyl radicals, (b) up to 50%, by weight, of an inorganic filler, and (c) from 1 to 5%, by weight, of sulfur, as a vulcanizing agent for (a), the said vinyl groups in the organopolysiloxane being the only silicon-bonded alkenyl radicals in the covulcanizable mixture.

7. The rubbery product of claim 6 in which the inorganic filler is carbon black.

8. The rubbery product of claim 6 in which the first vulcanizable gum is natural rubber gum.

9. The rubbery product of claim 6 in which the first vulcanizable gum is a copolymer of a diolefin and a major proportion of isobutylene.

10. The rubbery product of claim 6 in which the first vulcanizable gum is a copolymer of butadiene and styrene.

11. The rubbery product of claim 6 in which the first vulcanizable gum is a copolymer of butadiene and acrylonitrile.

12. The method of forming a sulfur covulcanizate of an organopolysiloxane and a vulcanizable gum selected from the class consisting of natural rubber, a copolymer of a diolefin and a monoolefin wherein the diolefin is equal to at most 5%, by weight, of the total weight of the diolefin and the monoolefin, a copolymer of butadiene and acrylonitrile, a copolymer of butadiene and styrene, and a homopolymer of 2-chlorobutadiene, which comprises mixing (A) from 25 to 95%, by weight, of said vulcanizable gum, (B) from 5 to 75%, by weight, of a vinyl-containing organopolysiloxane having the formula $$(CH_2=CH)_a(R)_bSiO_{\frac{4-(a+b)}{2}}$$

where $a$ has a value of from 0.0086 to 0.18, $b$ has a value of from 1.80 to 2.0014, the sum of $a+b$ being equal to from 1.98 to 2.01, and R represents a member selected from the class consisting of alkyl, cycloalkyl, aryl, aralkyl, alkaryl and haloaryl radicals and mixtures of the aforesaid radicals, at least 50 mole percent of said members being methyl radicals, (C) up to 50%, by weight, of an inorganic filler, and (D) from 1 to 5% sulfur, the said vinyl groups in the organopolysiloxane being the only silicon-bonded alkenyl radicals in the covulcanizable mixture, and thereafter heating the aforesaid mixture of ingredients at a temperature of from 110° C. to 160° C. until vulcanization is effected.

13. A covulcanizate of a covulcanizable mixture comprising (a) from 45 to 99%, by weight, of a mixture containing on a weight basis from 25 to 95 parts of a vulcanizable gum selected from the class consisting of natural rubber, a copolymer of a diolefin and a monoolefin wherein the diolefin is equal to at most 5%, by weight, of the total weight of the diolefin and the monoolefin, a copolymer of butadiene and acrylonitrile, a copolymer of butadiene and styrene, and a homopolymer of 2-chlorobutadiene, and from 5 to 75 parts of an organopolysiloxane gum composition convertible to the cured, solid, elastic state having the formula $$(CH_2=CH)_a(R)_bSiO_{\frac{4-(a+b)}{2}}$$

where $a$ has a value of from 0.0086 to 0.18, $b$ has a value of from 1.80 to 2.0014, the sum of $a+b$ has a value from 1.98 to 2.01, and R represents a member selected from the class consisting of alkyl, cycloalkyl, aryl, aralkyl, alkaryl and haloaryl radicals and mixtures of the aforesaid radicals, at least 50 mole percent of said members being methyl radicals, and the said vinyl groups in the organopolysiloxane being the only silicon-bonded alkenyl radicals in the covulcanizable mixture, and (b) up to 50%, by weight, of an organic filler.

References Cited in the file of this patent
UNITED STATES PATENTS

| | | |
|---|---|---|
| 2,442,059 | Safford | May 25, 1948 |
| 2,445,794 | Marsden | July 27, 1948 |
| 2,557,928 | Atkinson | June 26, 1951 |
| 2,558,584 | Safford | June 26, 1951 |
| 2,589,317 | Young et al. | Mar. 18, 1952 |